(12) United States Patent
Leaverton

(10) Patent No.: US 6,939,463 B2
(45) Date of Patent: Sep. 6, 2005

(54) SPA AND POOL FILTER

(75) Inventor: Gregg W. Leaverton, Oceanside, CA (US)

(73) Assignee: A.H. Equipment Corporation, Anaheim, CA (US)

(*) Notice: Subject to any disclaimer, the term of this patent is extended or adjusted under 35 U.S.C. 154(b) by 0 days.

(21) Appl. No.: 10/720,551

(22) Filed: Nov. 24, 2003

(65) Prior Publication Data

US 2004/0104163 A1 Jun. 3, 2004

Related U.S. Application Data

(60) Division of application No. 10/448,876, filed on May 30, 2003, which is a continuation-in-part of application No. 09/990,616, filed on Nov. 21, 2001, now Pat. No. 6,685,843.

(51) Int. Cl.[7] .............................................. E04H 4/16
(52) U.S. Cl. .................. 210/169; 210/237; 210/256; 210/315; 210/416.2; 210/470; 210/484; 210/497.01; 55/357; 55/378; 55/380; 55/DIG. 2; 55/DIG. 26; 220/9.4; 220/495.11; 383/8; 383/102
(58) Field of Search ................................ 210/169, 237, 210/256, 315, 338, 342, 416.2, 470, 483, 484, 485, 497.01, 805; 220/9.4, 495.11; 4/507; 55/357, 361, 378, 379, 380, 382, DIG. 2, DIG. 26; 383/8, 33, 100–102

(56) References Cited

U.S. PATENT DOCUMENTS

| | | | |
|---|---|---|---|
| 2,044,827 A | 6/1936 | Adams | |
| 2,091,137 A | 8/1937 | Carson | |
| 2,100,374 A | 11/1937 | Biever | |
| 3,568,413 A | 3/1971 | Jerabek | |
| 3,698,161 A | 10/1972 | Brixius et al. | |
| 3,850,594 A | 11/1974 | Higgins | |
| 3,890,290 A | 6/1975 | McCabe | |
| 4,089,664 A | 5/1978 | Noland | |
| 4,253,959 A | 3/1981 | Tafara | |
| 4,488,883 A | 12/1984 | Philp | |
| 4,769,052 A | 9/1988 | Kowalski | |
| 4,913,815 A | 4/1990 | Shulda | |
| 5,152,890 A | 10/1992 | Linnersten | |
| 5,338,446 A | 8/1994 | Schuman et al. | |
| 5,910,247 A | 6/1999 | Outterside | |
| 6,007,714 A | 12/1999 | Keith | |
| 6,013,178 A | 1/2000 | Strano et al. | |
| 6,685,843 B2 * | 2/2004 | Leaverton | 210/805 |

* cited by examiner

Primary Examiner—Robert James Popovics
(74) Attorney, Agent, or Firm—Fulwider Patton Lee & Utecht, LLP

(57) ABSTRACT

A filter for a spa or pool, having a filter body which receives a filter bag having a sheath encompassing the exterior of the filter body and a pocket extending inwardly from the front end of the sheath into the filter. Operation of the spa water circulation system draws spa water into the filter bag pocket while concurrently spa water is drawn transversely through the filter bag sheath and auxiliary spa water openings into the filter body. An O-ring encircles the upper portion of the filter bag to releasably retain such bag to the filter body during operation of the spa water circulation system.

11 Claims, 7 Drawing Sheets

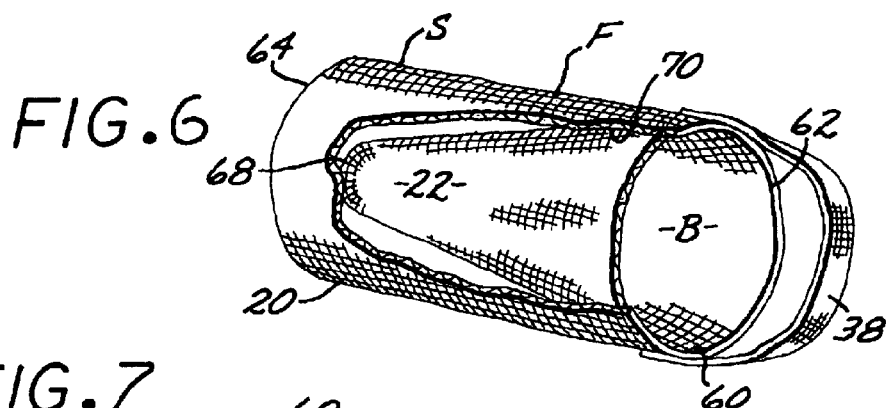
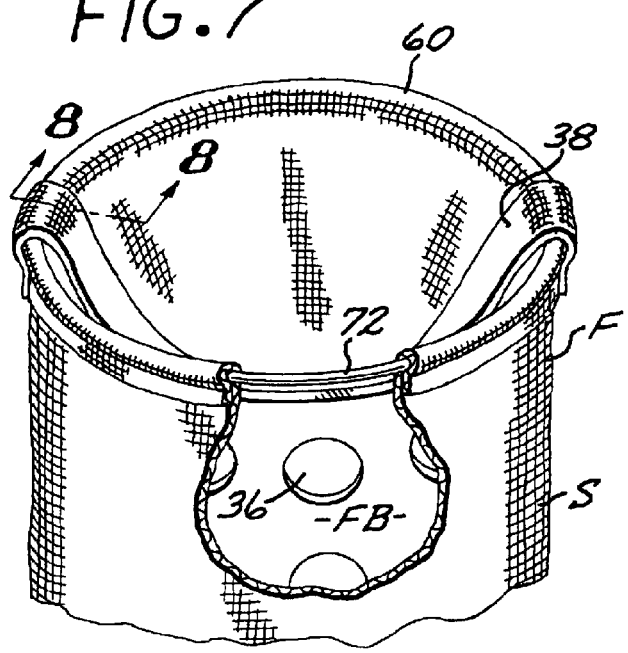
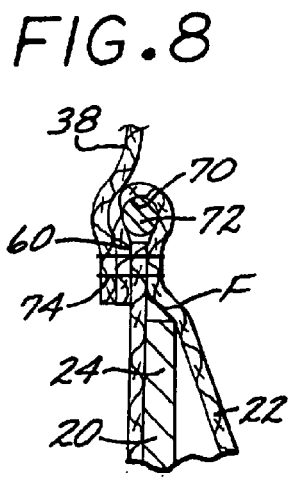
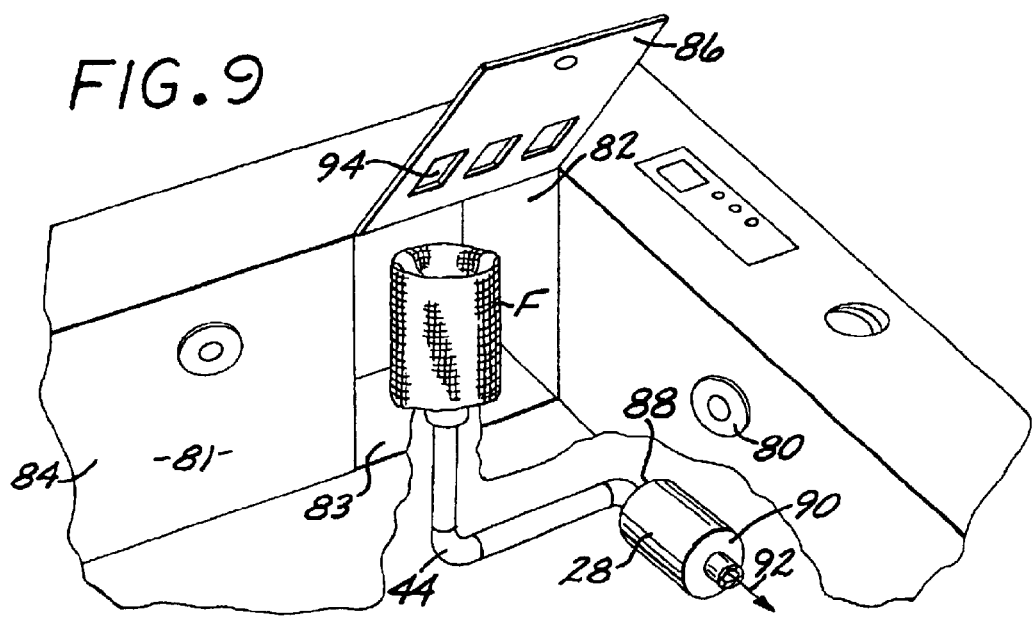

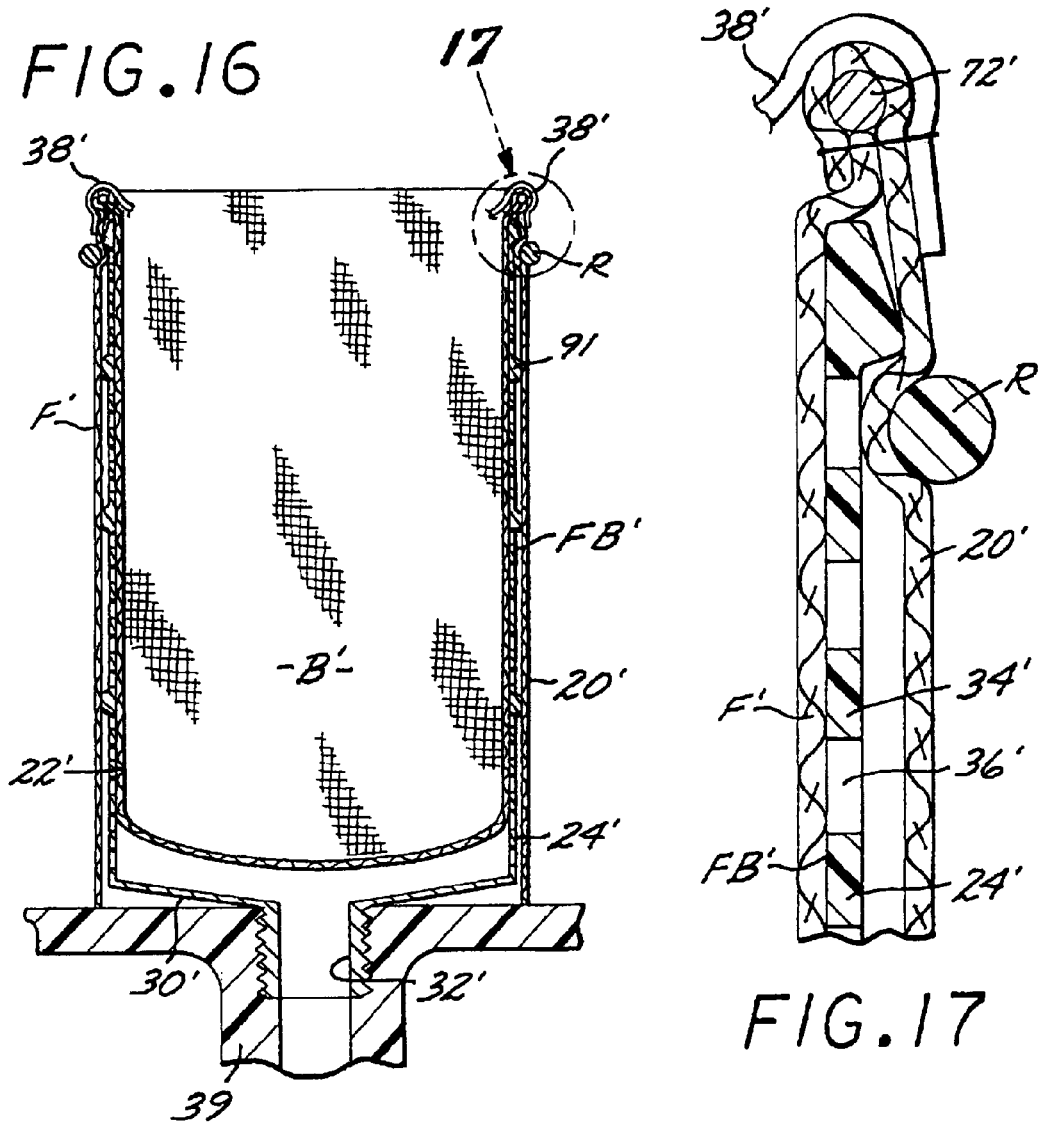
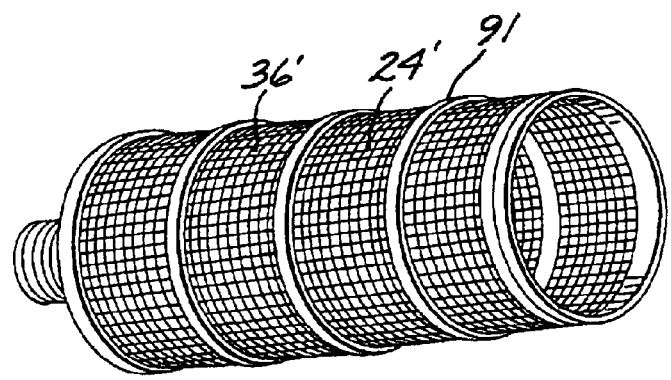

SPA AND POOL FILTER

CROSS-REFERENCE TO RELATED APPLICATION

This application is a divisional of U.S. patent application Ser. No. 10/448,876 filed by me on May 30, 2003, which is a continuation in part of U.S. patent application Ser. No. 09/990,616, filed by me on Nov. 21, 2001, now U.S. Pat. No. 6,685,843.

BACKGROUND OF THE INVENTION

1. Field of the Invention

The present invention relates to filters for liquids. More particularly, the present invention is directed to an internal filter for use in the water circulation systems of conventional pools or spas.

2. Description of Related Art

Filters of various configurations are known in the art for use in swimming pools, spas, and the like in order to remove solid particles and debris from the circulated water. Such filters are typically mounted in-line within the pool or spa circulation system and are configured with a liquid-permeable filter media such that, when the circulation system is in operation, the water can be pulled through the filter and pumped back into the pool or spa, leaving the captured debris on the filter for subsequent removal.

The conventional cartridge filter as is known and used in the art is generally comprised of a cylindrical filter element having one or more layers or sheets of a porous material configured with a pore size to allow the passage of water while trapping and removing the solid particles from the water that are unable to pass through the pores. As the filter traps more and more solid particles, the pores in the filter media become clogged, inhibiting the flow of water through the pool or spa's circulation system and thereby decreasing performance and possibly even damaging the circulation pump. In an attempt to address these concerns, the cartridge filters known in the art typically employ relatively large sheets of the porous filter material that are pleated so as to provide an increased filter surface area, thus increasing the life and performance of the filter, while not increasing the filter's overall size. The filter material is maintained in its cylindrical, pleated configuration by being mounted on a rigid cylindrical core and capped on each end by an annular end cap.

Though the conventional cartridge filter is in wide use, there are still several shortcomings with this filter type that have not yet been overcome. First, the flow rate through the cartridge filter is limited by the material and configuration of the pleats and the apertures in the rigid cylindrical core. Such flow rate is typically on the order of 40–70 gpm when the filter is new. Second, despite the overall increased surface area of the filter material achieved by the pleats, only so much of this surface area is truly usable, as the folds of the pleat are tight and are butted up against the cylindrical core. Moreover, as particles and debris become lodged between the pleats, the useful filter surface area that is lost is effectively doubled because the particles and debris clog pores on both adjacent surfaces of the pleat. Thus, cartridge filters become clogged and experience decreased flow rates relatively quickly. A third shortcoming of the cartridge filters known and used in the art is that they cannot be readily cleaned after becoming clogged. In the interest of increasing the total filter surface area, the pleats of the typical cartridge filter are numerous and densely configured about the filter's circumference. Thus, in order to remove the debris trapped deep within the pleat folds, high pressure reverse flow or meticulous debris removal using a vacuum or manual technique between each pleat is necessary. It is further recommended that the cartridge be soaked overnight in a cartridge cleaning solution and then be thoroughly cleaned a second time before being returned to use. Because of these inconveniences, some pool and spa owners simply use their cartridge filters until they become clogged and discard them, often prematurely, rather than bothering to clean them out. Moreover, because cartridge filters trap debris on the outside of the filter only, when the filter is removed from the pool or spa for cleaning or disposal, it is possible that the debris that is loose and easily removed will fall off the filter into the clean side of the circulation system rather than being permanently removed.

For these reasons, other pool and spa filters have been proposed in the art. Diatomaceous earth ("DE") filters house internal, parallel grids made of extremely fine mesh that is coated with DE, that acts as an adhesive and traps particles and debris from the water as it is filtered through the layers of DE grids. These DE filters are relatively more expensive than comparable cartridge filters and may be subject to municipal or environmental authority regulations pertaining to cleaning and disposal. Similarly, sand filters have also been proposed that essentially use a sand and gravel filter medium that mixes with the circulated water as it passes through the filter to pull out dirt and debris. However, the debris is not permanently captured by the sand filter medium and can eventually work its way through the filter and back into the pool or spa circulation system. It has been proposed that an additional solution be added to the sand to coagulate the particles and debris being filtered into larger clumps that can be more easily trapped by the sand filter medium. As a further maintenance step with sand filters, periodically, the sand itself is depleted from the filter and more sand of a specific type must be added. Sand filters, like the DE filters, are more costly than cartridge filters.

Bag-type filters for separation of unwanted solids from liquid process flows have also been employed in various industrial filtration applications in the interest of increasing flow rate and efficiency. To this end, filter assemblies having bag filters supported on rigid structures or stiffening frames and having elaborate sealing arrangements between the filter and the surrounding housing have been proposed. For example, U.S. Pat. No. 4,769,052 to Kowalski is directed to a flexible fabric filter bag apparatus having multiple support surfaces. A double-walled, porous cylinder cooperates with a stretching frame to suspend and support the filter bag within a rigid cylindrical outer housing. An annular flange is provided in the housing's inner wall and is configured to sealingly engage a metal ring within the bag's open end when the bag, the double-walled cylinder, and the stretching frame are positioned inside the outer housing. A cover is installed over the open end of the outer housing to seal the filter and to force the stretching frame downwardly to draw the filter bag taut against the surfaces of the double-walled support cylinder.

U.S. Pat. No. 5,910,247 to Outterside is directed to a similar filter bag system. Like the Kowalski filter apparatus, Outterside discloses essentially a double-walled filter support cylinder, consisting of an outer basket and an inner tubular member, a housing having a lid for sealing the filter, and a filter bag having a ring in its open end to sealingly engage a flange on the basket. Outterside further discloses specific dimensions for the filter bag which purportedly maximize the surface area without restricting the process flow rate.

Moreover, the Outterside system's supporting structures are configured to prevent collapse of the filter bag when the process flow is reversed to backwash and clean the filter without removing it. Hence, it is essential that the filter bag fit snugly and securely over the outer basket and inner tubular member. To this end, Outterside discloses that the filter body is smaller in diameter than the outside diameter of the tubular support member so that the filter must be stretched to fit over the tubular body and is retained thereon through a frictional fit.

Therefore, the bag filters known and used in the prior art essentially entail a multi-walled support structure that may further include additional stretching or stiffening frames, a filter bag that is secured on the support structure and shaped by the alternative frames, and a filter housing, or vessel, that contains the filter bag assembly and provides for a positive seal between the "dirty" and "clean" side of the filter along a ring integral to the bag's open end. Based on the configuration and number of components in these prior art industrial bag-type filters, it follows that such filters are not well-suited for use in spas because of their complex design and inherent relatively high cost. Furthermore, the housing, which plays a critical role in the function and performance of the prior art bag-type filters, is particularly ill-suited for use in a spa's circulation system because the conventional spa's filter-receiving cavity cannot accommodate the housing, and the housing itself, having only one small inlet strategically positioned above the location where the filter is sealed within the housing, would likely perform poorly under the changing water levels and other conditions of a pool or spa during use.

Thus, there exists a need for an inexpensive, convenient, and functionally efficient filter for use in spas and the like that is both easily reusable and disposable.

SUMMARY OF THE INVENTION

The present invention is directed to an internal spa filter including a filter body and a complementary filter bag having a sheath which encompasses the exterior of the filter body and an internal pocket which extends into the filter body. The filter body is configured to be installed within a spa's water circulation system in order to filter particles and debris out of the water. As the spa water is circulated, through the filter body a vortex effect is created within the filter bag pocket trapping debris therein for later removal without the risk of the debris falling off the filter and back into the spa water. The configuration and materials of the spa filter of the present invention, as compared to the prior art filters, provide for much higher flow rates through the filter, further enhancing both the performance and life of the pump of the spa circulation system. Moreover, the spa filter of the present invention is relatively inexpensive to manufacture, whereby, after prolonged use, the filter bag itself may be either readily cleaned and reused or alternatively simply discarded.

The filter body of the spa filter of the present invention is defined by a cylinder having a spa water opening at its inlet end and a spa water discharge orifice at its opposite end. Throughout the filter body's cylindrical wall is formed, a pattern of auxiliary spa water inlet openings. The inlet and auxiliary openings permit the passage of the circulated spa water from the outside of the filter body to the inside thereof. The sheath of the filter bag is joined to the pocket thereof along a circumferential inseam. Accordingly, when the bag is placed about the filter body, the closed end of the pocket is inserted within the filter body's open end while the sheath encompasses the outside surface of the filter body's cylindrical wall, with the inseam of the filter bag positioned substantially along the inlet edge of the cylindrical wall's inlet end to maintain the position of the filter bag on the supporting filter body. The pocket extends towards the discharge end of the filter body.

One embodiment of the filter body utilizes a cylinder, the sides of which are formed with a pattern of round through-hole openings preferably having a nominal diameter of 0.60". For a cylinder having an outside diameter of approximately 5½" and a length of approximately 8", sixteen such holes are radially-spaced apart in each of six parallel, circumferential rows in the wall to yield a total of ninety-six through holes generally spaced uniformly throughout the wall. In an alternative filter body embodiment, a mesh-type pattern is formed in the cylinder sidewall having a pattern of small, square apertures throughout the wall arranged in spaced-apart relationship about parallel circumferential rows substantially throughout the wall. Because the square apertures are relatively smaller than the through-hole apertures of the first embodiment, for the same overall dimensions of the wall, the number of square apertures and the number of rows are significantly increased, yielding a total of more than two-thousand square apertures. A third embodiment of the filter body of the present invention has lengthwise axially extending slots formed about its circumference. Yet another embodiment of the filter body of the present invention utilizes a plurality of longitudinally spaced reinforcement rings formed on the wall of the cylinder.

In each embodiment of the filter body, the body includes an open inlet end about which the filter bag sheath is draped and an opposite rear closed discharge end formed by a rear wall integral with the rear end of the filter body and generally normal to the axis of the filter body. A central circular discharge orifice is provided in the wall for discharge of the flow of the spa water entering the filter body through the filter bag. A length of tubing extends from the discharge orifice normal to the rear wall and projecting axially away from the filter body. The tubing is configured with external threads for threadably engaging piping of the spa's circulation system. Preferably, the filter body will be positioned vertically within a filter-receiving bag of the spa with the inlet end of the cylinder disposed above the discharge end thereof so that water from the tub of the spa is drawn downwardly through the filter body to the suction end of the spa's pump. The filter body may be constructed of a thermoplastic material such as polyethylene (PE), polypropylene (PP), polyvinyl chloride (PVC), or acrylonitrile butadiene styrene (ABS). These materials are readily available, are relatively inexpensive, and are easily processed using injection molding and finishing techniques known in the art.

The filter bag of the present invention includes a support ring at the juncture of the sheath and pocket along a circumferential inseam formed by looping the upper end of the pocket over the upper end of the sheath to form a loop or circumferential cavity. The support ring preferably has a nominal diameter substantially equivalent to the nominal diameter of the filter body so as to be positioned adjacent the upper end of the filter body when the filter bag is placed on the filter body, thereby maintaining the filter bag in position and keeping the pocket open during use. To this end, the support ring is to be constructed of any suitable rigid or semi-rigid material such as a thermoplastic material or stainless steel. To maintain the position of the support ring within the circumferential cavity and to secure the inseam, stitching, welding, stapling or other fabric attachment means known in the art are employed.

A removal handle spans the open upper end of the filter bag pocket and is attached at two opposite locations. The handle may be stitched, welded, or otherwise joined to the filter bag using any attaching means known in the art, but is preferably attached within the inseam itself. The length of the handle is sufficient to loosely span the pocket opening, so that the handle may droop within the pocket when not in use and may be pulled up for convenient access when the handle is to be grasped to remove the filter bag from the filter body.

The filter bag of the present invention may be constructed of a durable, porous, fibrous material known in the art for use in various filtration applications. Though many types of fabrics may be used in fluid filtration to effectively remove debris and particulate matter while allowing the fluid itself to pass through the filter media, in a preferred embodiment, the material selected will have a porosity rating of 40 to 50 microns and have a weight on the order of 12 oz/Yd$^2$. Examples of suitable materials include polypropylene (PP), polyethylene (PE), polyester felt, or fiberglass. The handle may be made of the same material as the sheath and the pocket or may be made of a conventional cotton and polyester textile material.

Another embodiment of the filter bag of the present invention utilizes an annular resilient element such as an O-ring which is removably engageable with the upper portion of the filter bag to anchor such bag against inadvertent upward movement along the outer surface of the filter body due to water turbulence during operation of the spa pump.

In operation, after the sheath of the filter bag has been removably positioned in covering relationship over the filter body with the bag pocket extending into the filter body, the internal spa filter of the present invention is ready for use and is installed within the filter-receiving bay of a conventional spa with the filter in direct communication with the spa's circulation system on the suction side of the pump. Once the spa tub is filled with water and the circulation system is operated, the water is drawn through the filter by the pump. Because the inlet opening of the filter body, approximately 5½" diameter, is relatively larger than the discharge orifice at the closed end of the filter body, which is typically on the order of about 2–3", this difference in area will naturally create a vortex tending to draw the water down through the filter pocket, pulling larger debris into the pocket and trapping it there for later removal. The vortex action and the resulting strong suction of water through the filter also creates a vacuum pressure on the inside of the filter that serves to pull the filter bag's sheath tightly against the exterior of the filter body, thus effectively creating a tight fit between the sheath and the filter body which causes all water being pulled through the filter to pass through the filter bag.

The porosity of the filter bag material, the configuration of the open pocket, and the vortex effect cooperate to provide for higher flow rates through the filter (on the order of about 150 gallons per minute) as compared to conventional prior art spa filters. This increased flow rate translates to enhanced performance of the spa in terms of the relaxation and therapeutic benefits to the user and the life of the circulation pump.

When the filter bag of the present invention has become sufficiently dirty that it should be cleaned or replaced, the spa's circulation system is shut down and the filter bag is simply lifted out of the filter body by grasping the handle. The debris trapped by the filter during use will remain within the inside pocket, thereby not contaminating the spa water as the filter bag is removed from the filter-receiving bay. If the filter bag is removed from the spa to be cleaned for reuse, the bag is dumped or rinsed out to remove all debris that has been trapped or alternatively may be washed or laundered in a conventional washing machine and dryer to more thoroughly clean and sanitize the bag. If it is preferred that the filter bag be replaced rather than being cleaned, the used filter bag may be simply discarded and a new bag put into the filter body. Because the materials and construction methods employed in producing the filter of the present invention are relatively inexpensive, disposing of the filter bag is both a convenient and economical substitute for cleaning the bag.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 6 is a cut-away perspective view of the filter bag shown in FIG. 1;

FIG. 7 is a cut-away perspective view of the filter bag positioned upon the filter body of FIGS. 1, 2, and 3;

FIG. 8 is a vertical sectional view taken along line 8—8 of FIG. 7;

FIG. 9 is a perspective view of an internal spa filter of the present invention installed within a spa's filter-receiving bay.

FIG. 16 is a vertical cross-sectional view of the filter and modified filter bag of FIGS. 14 and 15;

FIG. 17 is an enlarged view of the encircled area designated 17 in FIG. 16;

FIG. 18 is a perspective view of a modified form of the basket used in the filter body embodying the present invention;

DETAILED DESCRIPTION OF THE PREFERRED EMBODIMENTS

Figure 1:
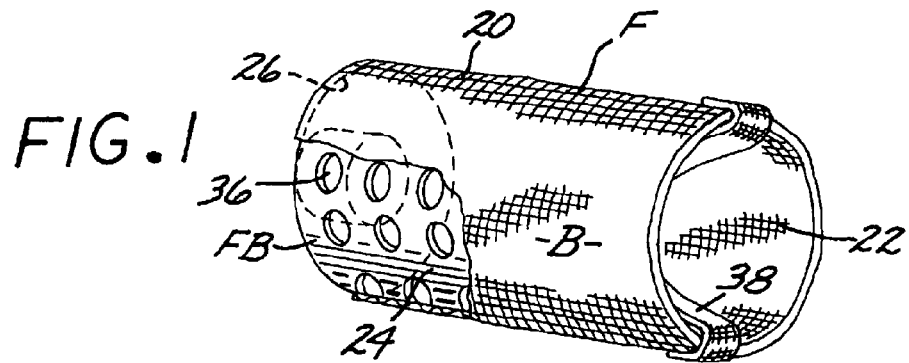
FIG. 1 is a cut-away perspective view of an internal spa filter embodying the present invention showing the filter bag positioned on the cylindrical filter body.

As shown in the drawings for purpose of illustration, an internal spa filter of the present invention utilizes a filter bag removably disposed upon a cylindrical filter body and configured to be installed within a spa's circulation system in order to filter particles and debris out of the spa water. While the spa filter embodying the present invention is described and depicted as being used in a conventional spa, it will be appreciated that the invention can also be used in conjunction with above- and below-ground swimming pools, hot tubs, Jacuzzis, or with any other system involving recirculated water that is to be filtered.

Figure 3:
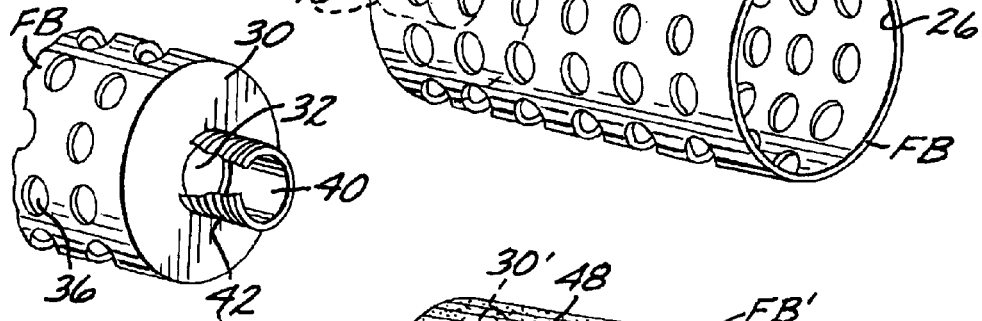
FIG. 3 is a broken perspective view of the discharge end of the filter body shown in FIG. 1.
Figure 10:
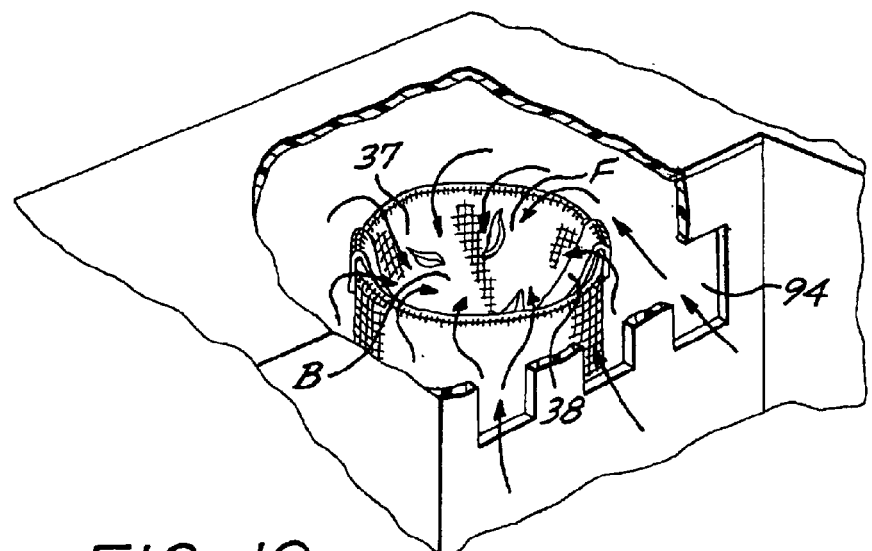
FIG. 10 is a cut-away perspective view of said internal spa filter during operation of the spa's water circulation system.
Figure 11:
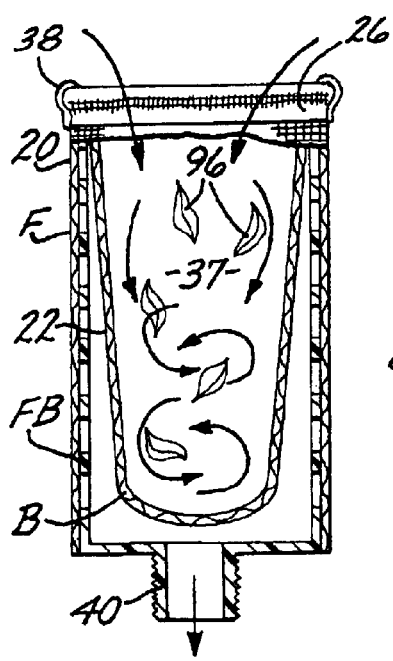
FIG. 11 is a vertical sectional view showing the operation of a vortex created during operation of the spa's water circulation system.

More particularly, referring to FIG. 1, a preferred embodiment of an internal spa filter F of the present invention includes a cylindrical filter body FB and a filter bag B having a cylindrical sheath 20 and a pocket 22 that extends concentrically inwardly from the inlet end of the sheath. The upper end of the cylinder 24 of the filter body is open to define an inlet opening 26 for spa water drawn downwardly through the cylinder by the pump 28 of the spa's water circulation system (FIG. 9). The lower end of the cylinder 24 is closed by a bottom wall 30 centrally formed with a discharge orifice 32 (FIG. 3). The sidewalls 34 of cylinder 24 are formed with auxiliary spa water openings in the form of holes 36 that admit spa water that is drawn into cylinder 24 through sheath 20 of the filter bag. In the use of the internal spa filter F all spa water being circulated through the filter will pass through and be filtered by the filter bag. Moreover, the discharge orifice 32 is smaller in area than the inlet opening 26 so that a vortex 37 is created during circulation of the spa water which traps debris in the pocket 22 for later removal as indicated by the arrows in (FIGS. 10 and 11). A handle 38 is provided on the filter bag to permit the bag to be conveniently lifted from the filter body for cleaning or replacement.

A short tube 40 coaxial with the discharge opening 32 extends downwardly away from cylinder end wall 30 to form a water connection means between discharge orifice and the suction end of pump 28 (FIG. 9) of the spa's water circulation system. The tube 40 is formed with threads 42 for threadably engaging piping 44 connected to pump 28. A preferred conventional thread size is 1.50 mps with a major thread diameter of approximately 1.90". This thread configuration accommodates a bore 64 through the tubing 60, and thus a circular opening size, of about 1½".

Figure 2:
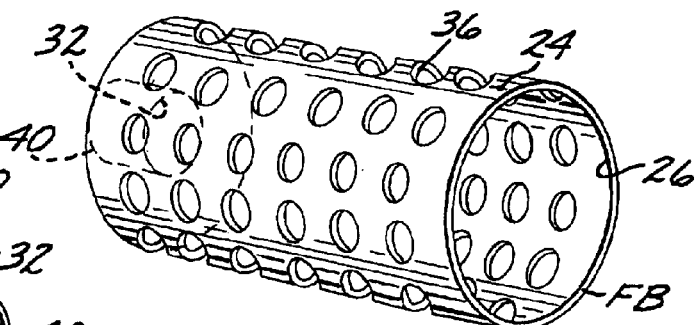
FIG. 2 is a perspective view of the filter body shown in FIG. 1.

With continued reference to FIG. 2, the holes 66 are round and preferably have a nominal diameter of about 0.60". In this same embodiment, sixteen such holes are radially-spaced apart in each of six parallel, circumferential rows in the cylinder 24 to yield a total of ninety-six through holes generally spread uniformly throughout the wall of the cylinder sidewall. It will be appreciated that the cylinder may be of a variety of lengths and diameters and that as the overall dimensions of the cylinder change, the pattern of holes may change accordingly in order to maintain a generally uniform distribution of the holes throughout the wall of the cylinder. In the embodiment shown in FIG. 2, the cylinder is configured with a nominal outside diameter of 5½" and a length of 8", as is typical in the art of spa filters, permitting a filter of the present invention to be capable of use with the majority of spas currently on the market.

The filter body FB may be constructed from a number of different water-resistant materials known in the art. A preferred material is a thermoplastic such as polyethylene (PE), polypropylene (PP), polyvinyl chloride (PVC), or acrylonitrile butadiene styrene (ABS). It will be appreciated that these materials are readily available, are relatively inexpensive, and are easily processed using injection molding and finished techniques known in the art. Because the filter body is configured to be one integral unit, the injection molding process is both effective and efficient in this application. In an alternative embodiment, the threaded tubing 40 may be formed separately through a molding or machining operation and bonded or welded to the filter body in a secondary operation.

Figure 4:
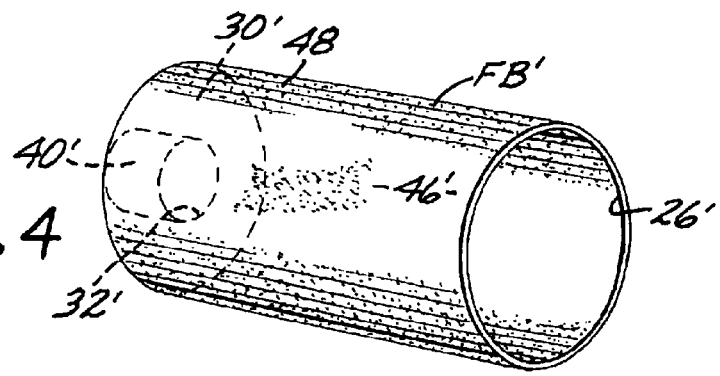
FIG. 4 is a perspective view of a first alternative embodiment of the filter body.

Referring now to FIG. 4, an alternative embodiment of filter body FB' of the present invention, utilizes a cylinder 46 having a pattern of auxiliary water openings in the form of small apertures 48 formed throughout the wall of the cylinder to define a mesh-type construction. Preferably the apertures will be square shaped. Apertures 48 are arranged in spaced-apart relationship about parallel circumferential rows substantially throughout the wall of cylinder 24', but, because the apertures are relatively smaller than the through-holes 36, the number of apertures and the number of rows are significantly increased. Thus, in one such embodiment, a cylinder 24' having a 5½" nominal outside diameter and an 8" length is configured with thirty-three rows of sixty-nine ⅛" apertures each and, thus, has a total of 2,277 apertures in the tubular wall. It will be appreciated that though the number of apertures is significantly increased over the number of through-holes in the filter body FB of FIG. 2, the total area for throughput of fluid from the outside of the filter body to the inside is not necessarily increased commensurately, but is, however, increased significantly. For example, in the exemplary embodiments disclosed, the total throughput area for the ninety-six through-holes (FIG. 2) is 27.1 in 2 as compared to a total throughput area for the 2,277 apertures (FIG. 3) of 35.6 in 2. As with the filter body FB, the mesh filter body FB' includes a flat wall 30' formed with a discharge orifice 32'. A central, externally-threaded tube 40' extends from wall 30' for engaging the spas circulation system. The front of cylinder 24' defines a spa water inlet opening 26'.

With reference now to FIG. 4, there is shown a third embodiment of a filter body FB' of the present invention. Filter body FB' utilizes a cylinder 24' having auxiliary spa water openings in the form of lengthwise rectangular slots 52 formed about its sidewall. Slots 52 are defined by lengthwise, radially spaced-apart ribs 54 which extend along the wall of the cylinder. As with both the filter body FB and aforedescribed mesh filter body FB', the ribbed filter body FB' includes an inlet opening 26' and an integral bottom wall 30'. Bottom wall 30' is formed with a central circular discharge orifice 32' from which extends an integral threaded tubing 56 for engaging piping 40' of the circulation system of a spa.

Figure 5:
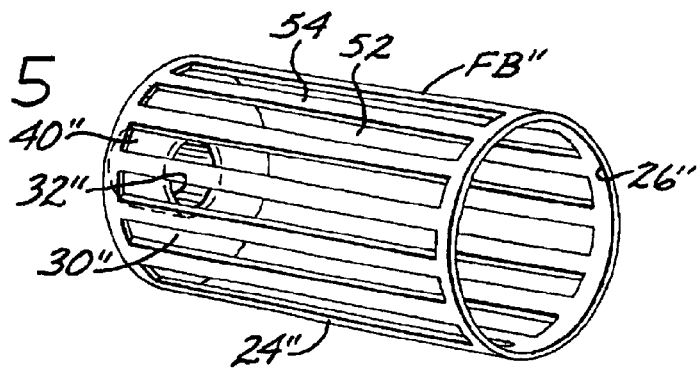
FIG. 5 is a perspective view of a second alternative embodiment of the filter body.

In the embodiment of the ribbed filter body FB', shown in FIG. 5, the nominal outside diameter of the cylinder is approximately 5½" and the overall length is approximately 8", just as for the aforedescribed filter body FB and the mesh filter body FB'. Twelve lengthwise ribs 54 may be spaced evenly about the circumference of the filter body at substantially 30-degree intervals, with each rib having a radial width of about 0.125". In this embodiment, the total throughput area for the twelve slots 52 is about 110 in 2, a significant increase over the throughput areas for both the filter bodies FB and FB'. The effect of the throughput surface areas of the various embodiments on the performance of the internal spa filter under use is explained below.

Referring now to FIGS. 6, 7, and 8, the filter bag F of the present invention includes a generally tubular outside sheath 20 attached to a generally conical inside pocket 22 along a circumferential inseam 60. The sheath has an upper inlet end 62 and a lower, discharge end 64, while the pocket has an upper end 66 continuous with the upper end of the sheath, and a lower end 68. The inseam 60 is formed by the union of the sheath and pocket along their respective upper ends. The lower end 68 of the pocket is stitched, welded, or otherwise formed closed to provide a radiused tip at the bottom of the generally conically shaped cavity 70.

Preferably in the filter bag F of the present invention, both the sheath 20 and the pocket 22 are constructed of a durable, porous, fibrous material known in the art for use in various filtration applications. It will be appreciated that many types of fabrics may be used in fluid filtration to effectively remove debris and particulate matter while allowing the fluid itself to freely pass through the filter media. In a preferred embodiment, the material selected will have a porosity rating of about 40 to 50 microns. Such a material would typically have a weight on the order of 12 oz/Yd$^2$. Examples of suitable materials include polypropylene (PP), polyethylene (PE), polyester felt, or fiberglass. Polypropylene is preferred, particularly for its longevity as compared to other similar fabrics.

The arcuate shaped handle 38 spans the open upper end 61 of the pocket 22 and is attached to the filter bag 20 at the inseam 60. Opposite first and second handle ends are attached at the inseam at approximately 180 degrees apart, on opposite sides of the sheath and pocket. The handle may be stitched, welded, or otherwise joined to the filter bag using any attaching means known in the art. The length of the handle is to be sufficient to loosely span the pocket opening, so that the handle may droop within the pocket when not in use and may be pulled up for convenient access when the handle is to be grasped to remove the filter bag from the filter body. The handle may be made of the same material as the sheath and the pocket or may be made of a conventional cotton and polyester textile material known for its durability, minimal shrinkage and wide range of uses.

Referring now to FIGS. 7 and 8, the inseam 60 is formed by looping the upper edge of the pocket over the upper end of the sheath so that the upper end of the pocket is substantially turned back on itself 180 degrees to contact both the inside and outside surfaces of the upper sheath end. In a preferred embodiment, sufficient clearance is left between the upper sheath end and the looped portion of the upper pocket end to form a loop or circumferential cavity 70 about the inseam 60. Disposed within the circumferential cavity is a support ring 72 of a circular cross-section. The support ring preferably has a nominal diameter substantially equivalent to the nominal diameter of the filter body so as to seat on the top end of the filter body when the filter bag is placed on the filter body, thereby maintaining the filter bag in position on the filter body and keeping the upper end of the pocket open during use. The support ring 72 is constructed of any suitable rigid or semi-rigid material such as a thermoplastic or stainless steel. Beyond the mechanical attributes of the support ring, the selected material must be water and corrosion-resistant. To maintain the position of the support ring 72 within the circumferential cavity 70 and to secure the inseam 60, a double-stitch 74 may be employed. As shown in FIG. 8, the stitch is to pass below the circumferential cavity through the outside, looped portion of the upper pocket end, through the upper sheath end, and then through the inside portion of the upper pocket end to hold the inseam together. It will be appreciated that the inseam may also be secured by other stitch configurations, welding, stapling or other fabric attachment means known in the art.

Referring now to FIG. 1, in preparing an internal spa filter F of the present invention for use, the filter bag FB is positioned on the filter body by sliding the lower sheath end 30 over the top end of the filter body until the top inseam 60 is substantially aligned with the top end of the filter body. In order for the filter bag to have a loose but functional fit on the filter body, the inside diameter of the sheath 22 is to be at least 0.100" larger than the outside diameter of the filter body, but no more than 0.300" larger, which would create a clearance of at least 0.050" between the filter bag and the filter body about the circumference. Thus, for example, in the embodiment of the filter body having a nominal outside diameter of 5½", the inside diameter of the filter bag sheath would be at least 5.600". In order for the filter bag to be in covering relationship about the outside surface of the filter body, the overall axial length of the sheath is preferably substantially equivalent to the axial length of the filter body's cylinder. In this way, when the filter bag is advanced as far as possible along the filter body and the inseam adjacent filter body's top end, the discharge end 64 of the sheath will be substantially adjacent the filter body's bottom end.

With continued reference to FIG. 11, at the same time that the filter bag's sheath is slidably advanced along the outside surface of the filter body cylinder 24, the pocket 22 is inserted through the filter body's inlet opening 26. The overall length of the pocket is preferably configured such that when the filter bag is operationally positioned on the filter body, the pocket's bottom end is substantially adjacent to the discharge orifice 32. In this way, the available surface area of the filter bag 20 for filtration is maximized without risking occlusion of the opening at the filter body's discharge end.

Referring now to FIG. 9, the water circulation system includes a pump 28 and discharge jets 80 interconnected by piping 44 disposed in the spa tub 81. A recessed, filter-receiving bay 82 is formed in a wall 84 of the spa. After the filter bag B has been positioned in covering relationship over the filter body of FIG. 1, 4 or 5, the internal spa filter of the present invention is ready to be positioned within the bay 82. As described above, the filter body is an externally-threaded tube 40 which is connected to piping 44 upstream of the suction end of pump 28 so as to dispose the filter F in communication with the spa's water circulation system. Preferably the filter F is arranged vertically on the floor 83 of the filter receiving bay in a water-tight fashion with respect to such bay. Once installed, the door 86 of the filter-receiving bay is closed over the opening to the bay in order to protect users of the spa from inadvertent contact with the filter.

In the use of the aforedescribed internal spa filter, the first step is to fill the tub 81 with water (not shown). In the conventional spas known in the art, the filter-receiving bay 82 and the filter F itself are configured such that when the spa tub is filled appropriately, the entire filter is submerged, with the top of the filter typically being at least two inches below the surface of the water. As the internal spa filter F of the present invention is configured to replace the conventional spa filters known in the art, it will be appreciated that it, too, will be located beneath the surface of the water in the spa. Once the spa tub is filled, the pump 28 is operated so as to circulate the water within the circulation system. The pump has an inlet (suction) side 88 and an outlet (discharge) side 90, so that the water is pumped through the system in one direction as indicated by the arrow 92.

In operation, the water contained in the spa's tub 81 first passes through inlet windows 94 in the filter-receiving bay door 86. The windows are positioned in the door such that when the door is closed and the spa is properly filled with water, the water level should fall between the top and bottom edges of the windows. It will be appreciated that in this way, larger debris that typically floats on the surface of the water such as leaves, twigs, hair, insects, etc., will be able to float through the windows and into the filter-receiving bay 82. The water is then drawn downwardly through the filter F by the pump 28. Because the inlet opening 26 of the filter body at its upper end, is relatively larger than the discharge opening 32 at the closed bottom end of the filter body the filter pocket 22 as shown in FIGS. 10 and 11. It will be appreciated by those skilled in the art that because the water level in the spa is above the top edge of the filter and the larger debris that typically floats on the water can pass through the windows in the filter-receiving bay door, the vortex action within the filter pulls the larger debris 96 into the pocket and traps it there for later removal.

The vortex action and the resulting strong suction of water through the filter F of the present invention when the spa's circulation system is operated also creates a negative, or vacuum, pressure on the inside of the filter and serves to pull the sheath 22 of the filter bag 20 tightly against the exterior of the filter body. Throughput is increased through the various embodiments of the filter body (FIGS. 2–4), the effect of the sheath being pulled tightly against the outside surface of the filter body is increased accordingly. It will be further appreciated that as the sheath is pulled tightly against the outside surface of the filter body during use, effectively, a tight fit is created. Therefore, all spa water passing through the auxiliary spa water inlet openings must pass through the filter bag's sheath.

The design and structure of the internal spa filter of the present invention provides yet another benefit for both the use and life of the spa. The porosity of the filter bag B material, the configuration of the pocket 22, and the vortex effect achieved through the relatively unimpeded swirling action of the water passing through the pocket and out of the filter body cooperate to provide for much higher flow rates through the filter than can be achieved by the commonly-used prior art cartridge filters. Typically, new and clean cartridge filters are capable of flow rates on the order of 100 gallons per minute, as limited by the material and structure of the pleated filter media. Whereas, the filter bag B disclosed herein is capable of flow rates of more than 150 gallons per minute, for a flow rate increase of approximately 50%. It will be appreciated by those skilled in the art that this increased flow rate translates to increased efficiency of the spa. For example, the increased flow rate allows for a more forceful flow of water from the spa jets 80, increasing the relaxation and therapeutic benefits to the user. Relatedly, the increased flow rate achieved through the filter of the present invention improves the performance and capabilities of state of the art jet configurations involving multiple "total body" jets or "waterfalls," for example. Moreover, because the circulation pump 28 is effectively working against less resistance from the filter, it does not have to work as hard to generate the increased flow rates, thereby prolonging the life of the pump.

Figure 12:
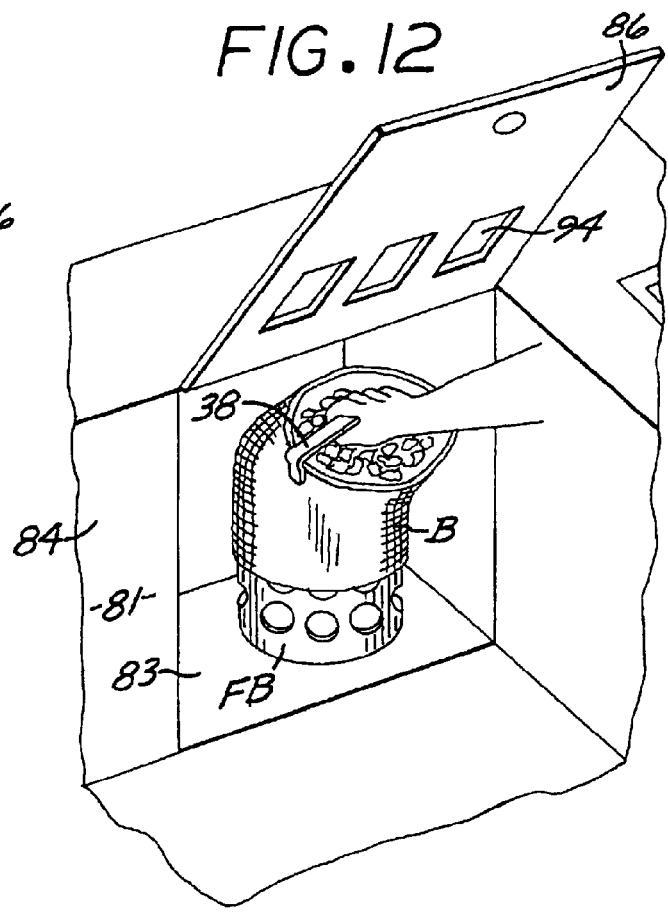
FIG. 12 is a broken sectional view showing a filter bag being removed from a spa's filter-receiving bay.
Figure 13:
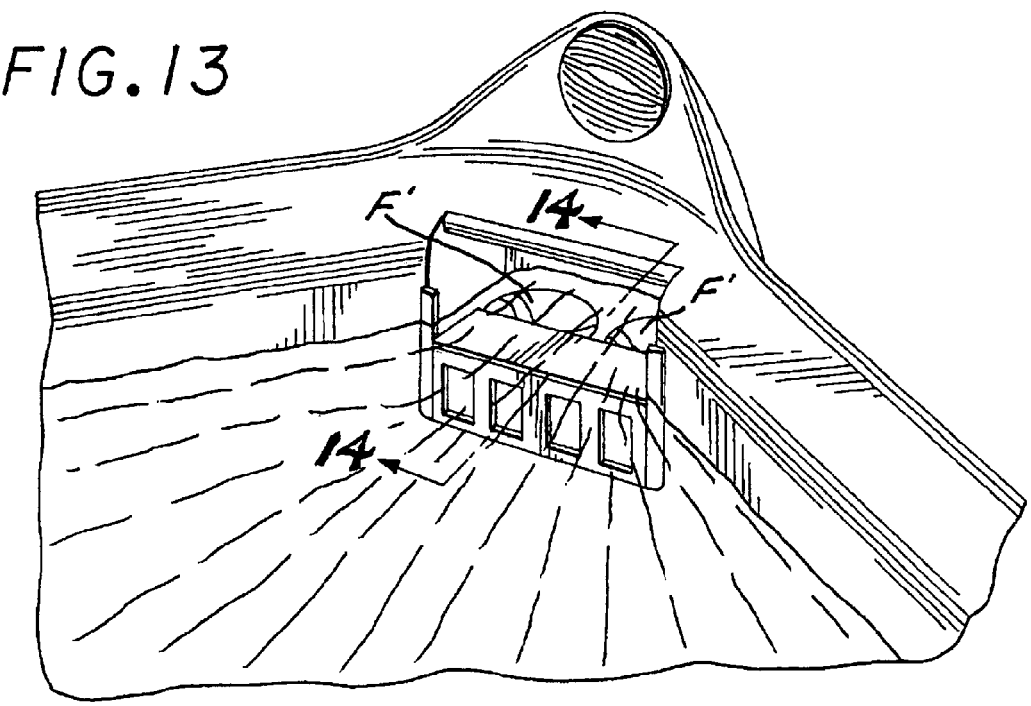
FIG. 13 is a broken perspective view showing a pair of filters embodying the present invention disposed within the skimmer bay of a spa.
Figure 14:
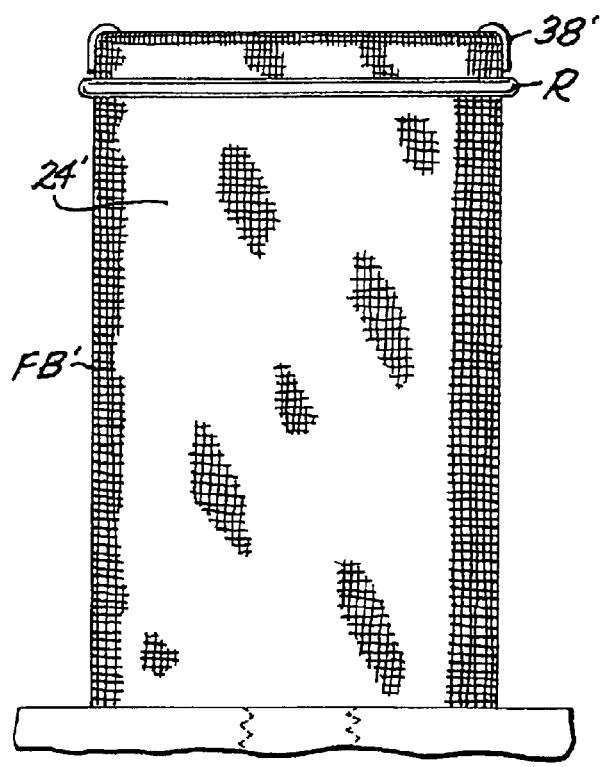
FIG. 14 is a vertical sectional view taken in enlarged scale along line 14—14 of FIG. 13 showing a modification of the filter bag.
Figure 15:
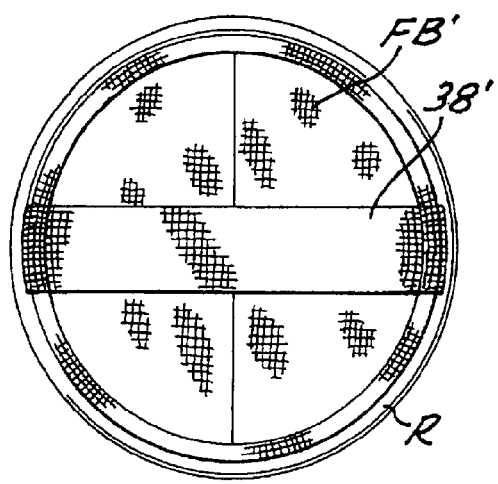
FIG. 15 is a top plan view of the filter bag shown in FIG. 14.

With continued reference to FIG. 12, when the filter bag B has become dirty and is to be cleaned or replaced, the spa's circulation system is shut down and the door 86 to the filter-receiving bay 82 is opened. The filter bag 20 may then be lifted out of the filter body FB by simply grasping the handle 38 and pulling the bag up and out of the filter body. It will be appreciated that the debris trapped by the filter during use will be, for the most part, contained within the filter bag pocket. In this way, when the filter bag is removed, the risk that any debris will fall out of the pocket and back into the spa water or into the clean side of the circulation system is reduced as compared to the typical prior art cartridge filter, where all debris is trapped on the outside of the filter and can easily fall off the filter and back into the spa when the filter is removed. Moreover, because the filter bag B is capable of being removed without unscrewing and removing the supporting filter body, the risk of loosening trapped debris and it falling back into the spa water is further reduced because of the decreased handling and manipulation of the filter. Aside from better maintaining the cleanliness of the spa water, the spa filter of the present invention is also more convenient to use, because of the reduced handling and the simplicity of lifting up on the filter bag handle to clean or replace the filter bag.

Once the filter bag B is removed from the spa, the bag may simply be dumped or rinsed out to remove all debris that has been trapped. Further, because of the structure and materials of the filter bag, the filter bag may also be washed or laundered in a conventional washing machine and dryer to more thoroughly clean and sanitize the bag. As is known in the art, to further sterilize the filter bag and chemically break down and remove any suntan lotions and other oils, calcification build-up, and the like, the bag may be soaked in a cleaning solution made up of water and an active ingredient such as tri-sodium phosphate or muriatic acid. If the filter bag has been in use for many months or is otherwise showing wear or other effects of use, making cleaning and reuse of the bag less optimal, the bag may be simply discarded and a new bag put into use. It will be appreciated that the materials and construction methods themselves employed in producing the filter of the present invention are known in the art and are relatively inexpensive, causing disposability of the filter bag to be a convenient and economical option in the user's ongoing spa maintenance program.

Referring now to FIGS. 13–18, there is shown a filter F' which utilizes a modified filter bag F' embodying the present invention. The components of filter F' are generally similar to those described hereinbefore with respect to FIGS. 1–12 and like components their primed referenced numerals. Thus, cylinder 24' has sidewalls 34' formed with auxiliary water openings in the form, of square apertures 36' that admit water drawn into cylinder 24' through sheath 20 of the filter bag B'. A plurality of longitudinally spaced reinforcement rings 91 are integrally formed along the length of the cylinder 24' to reinforce the sidewalls 34' of the cylinder. Referring to FIG. 16 the lower end of cylinder 24' is closed by bottom wall 30' centrally formed with a discharge orifice 32'. The upper end of the cylinder 24' defines an inlet opening 26' with the discharge orifice 32' being smaller in area than the inlet opening 26' so that a vortex is created during circulation of water passing through the filter F' which traps debris in the filter bag pocket 22' for later removal, as described hereinabove with respect to FIGS. 1–12. A handle 38' is provided on the filter bag B' to permit the bag to be conveniently lifted from the filter body FB' for cleaning or replacement.

As indicated in FIG. 16, the discharge orifice 32' of the filter body is defined by the upper end of a short tube 39' coaxial with the discharge opening and extending downwardly away from cylinder endwall 30' to form a water connection means such as piping 44' between the discharge orifice and the suction end of a pump (not shown). Referring to FIG. 17, it is a particular feature of the modified filter F' of the present invention that the upper portion of the filter body is provided with an annular O-ring R, which resiliently encircles the upper portion of filter bag B' and exerts a radially inwardly directed force against the exterior of the filter bag to releasably anchor the filter bag to the cylinder 24' so as to prevent inadvertent upward movement of the filter bag off of the filter body FB' during operation of the water circulation pump. In order to provide a positive anchoring of the filter bag FB' to the upper portion of the filter's cylinder 24', the upper end of cylinder 24' is preferably formed with an outwardly projecting shoulder 98 with the upper portion of the filter bag being releasably but positively locked against the shoulder by the O-ring R. When the filter bag is to be removed from the filter body, the O-ring is manually withdrawn upwardly off the filter body to release the filter bag from the filter body.

Figure 19:
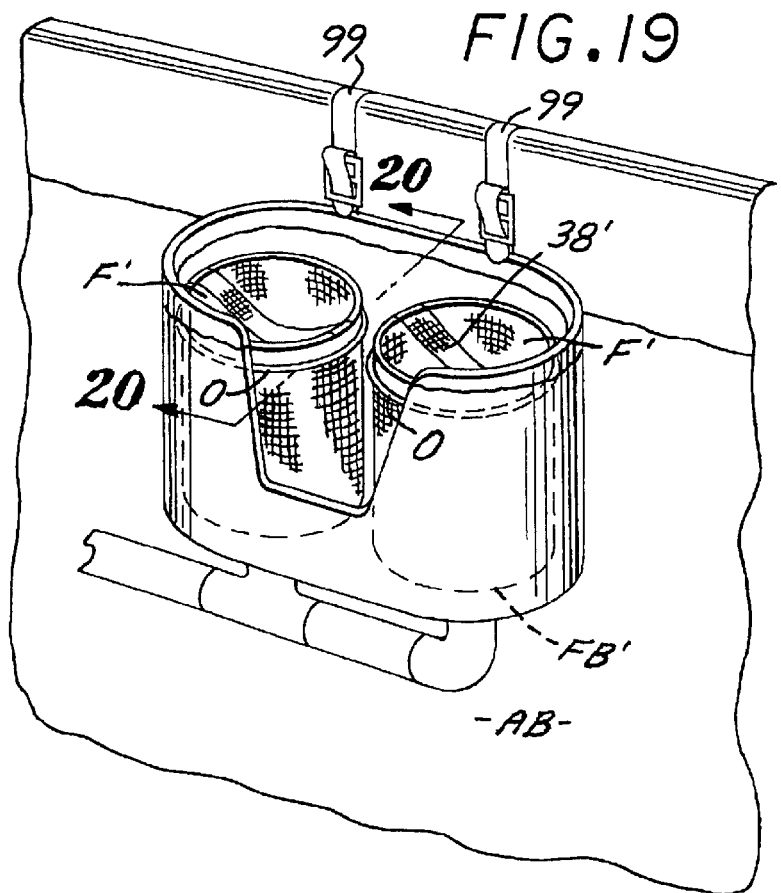
FIG. 19 is a broken perspective view showing a pair of filters embodying the present invention as utilized in a above-ground pool.
Figure 20:
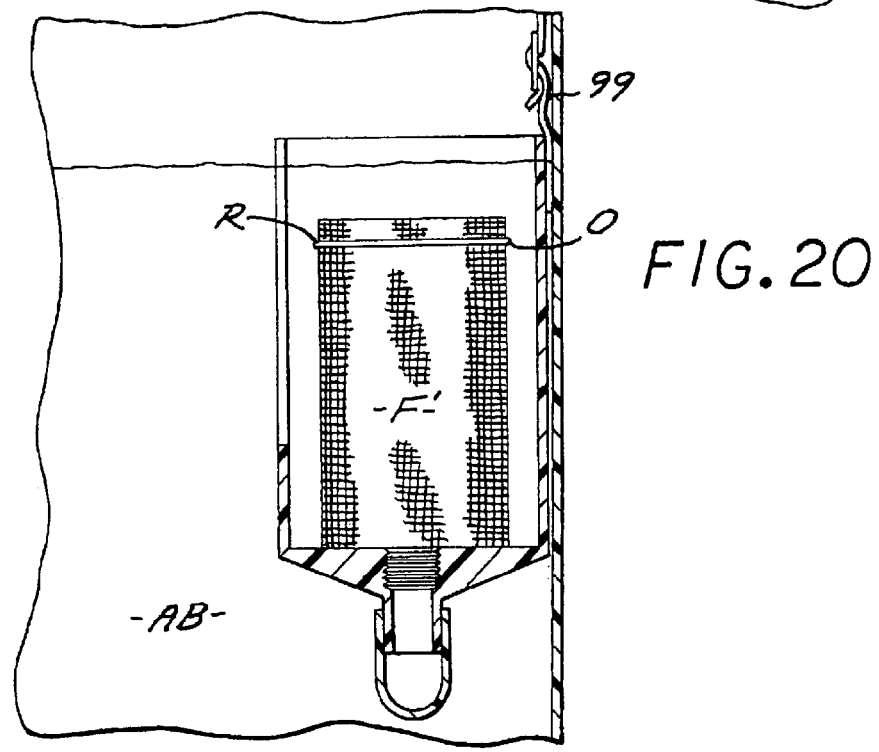
FIG. 20 is a vertical sectional view taken along line 20—20 of FIG. 19.

Referring now to FIGS. 19 and 20 there is shown a pair of the aforedescribed filters F' positioned within the skimmer box SB of an above-ground pool AB. The skimmer box SB is removably secured to the edge of the above-ground pool by adjustable straps 99. It should be understood that the lower ends of the filters F' are in communication with piping 100 connected to a conventional pump (not shown) utilized in the water circulation system of the pool AB. With particular reference to FIG. 20, when the filter bag FB' is to be removed from within the skimmer box FB, the O-ring 0 is manually slipped off of the top of the filter body FB'. Thereafter, the handle 38' is utilized to pull the filter bag FB' upwardly off of the filter body FB'. A filter bag can be easily reapplied to the filter body by manually pulling the lower portion of the filter bag downwardly over the basket cylinder 24' of the filter body. Thereafter the O-ring 0 is manipulated around the upper portion of the filter body until it is disposed in its position of FIGS. 19 and 20.

Figure 21:
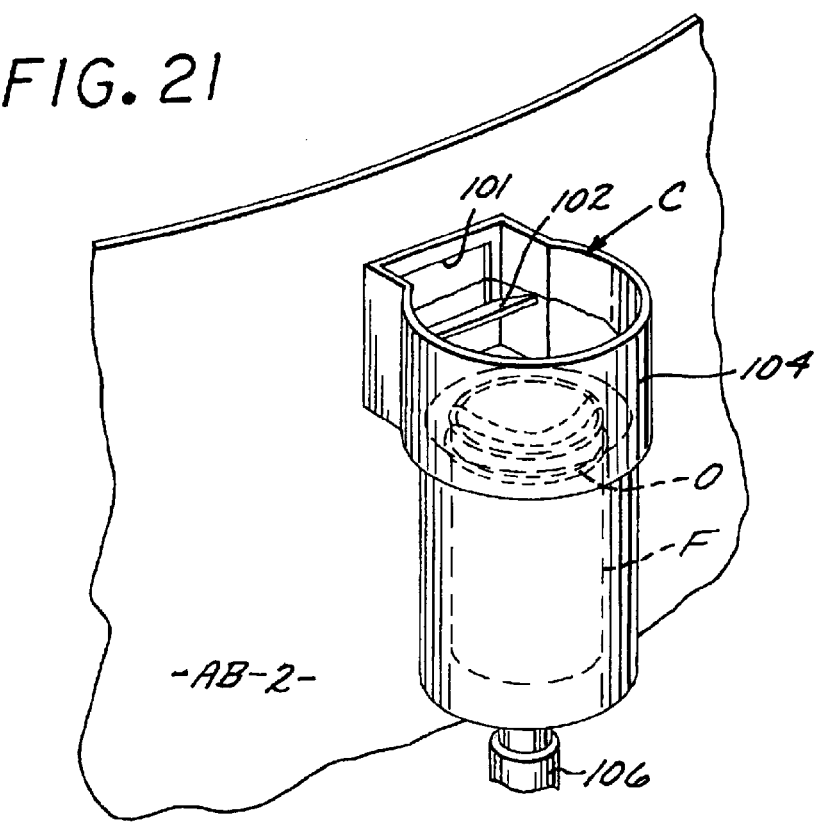
FIG. 21 is a broken perspective view showing a filter embodying the present invention utilized with the skimmer of an above-ground pool.

Referring now to FIG. 21, there is shown a second type of above-ground pool AB-2 from the upper portion of which extends a horizontal filter casing C which communicates with the water disposed within the pool through a window 101 provided with a conventional weir gate 102. The lower portion of the casing C is formed with a cylindrical housing 104 which receives either a filter F or F'. The discharge orifice of the filter for F' is connected to piping 106 which is in communication with a conventional pump (not shown) that provides circulation of the swimming pool water and downwardly from window 101 through the filter F'.

Figure 22:
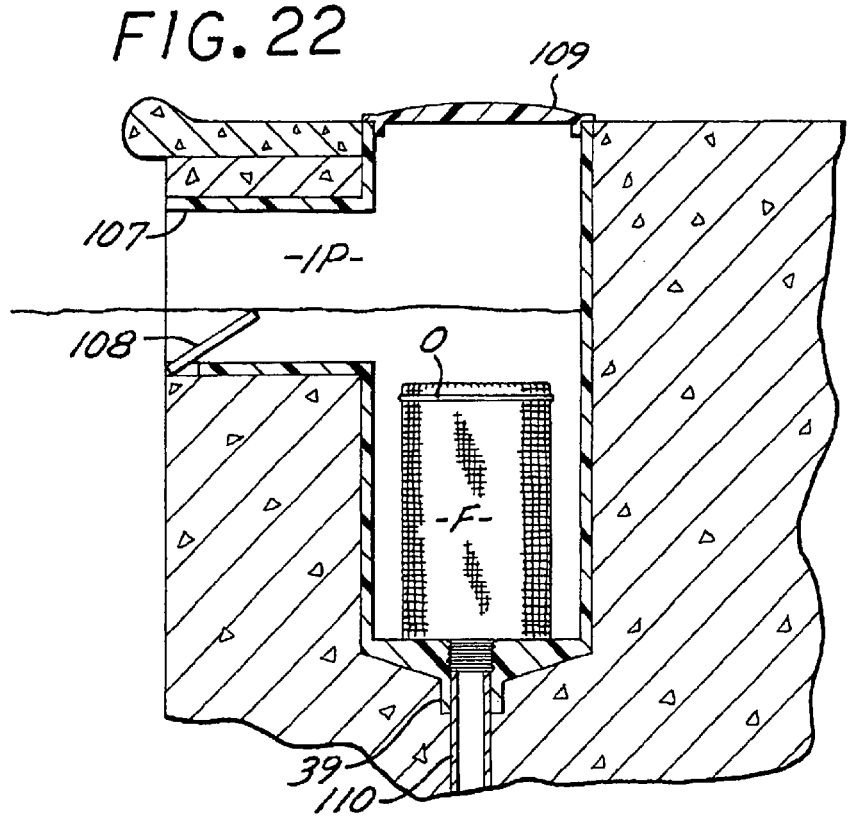
FIG. 22 is a vertical sectional view showing the filter of FIGS. 14 and 15 positioned in the skimmer bay of an in-ground pool.

Referring now to FIG. 22, there is shown an in-ground swimming pool IP having a skimmer bay 107 within which is disposed a filter F' of the type described hereinabove. The open end of the skimmer bay 107 is provided with a conventional weir gate 108. A removable cover 109 is provided for the upper end of the skimmer bay to provide access to the filter F' for removal and replacement of filter bag FB' and O-ring O. The tube 40' of the filter body is connected to piping 110 that is in communication with a conventional pump (not shown) which provides water circulation from the pool downwardly through the filter F'.

While embodiments of the invention have been illustrated and described, it will be apparent that various modifications can be made without departing from the spirit and scope of the invention. Accordingly, it is not intended that the invention be limited, except as by the appended claims.

I claim:

1. The combination of a swimming pool, a filter, a filter container open to swimming pool water, a swimming pool water circulation system that includes a pump and piping connected to the pump, and a filter for the swimming pool water, wherein the filter includes:
    a filter body disposed in the filter container, such filter body having a swimming pool water inlet opening at its upper end, a water discharge opening at its lower end and auxiliary water inlet openings in its sides;
    a filter bag releasably arranged in the cylinder for upward removal therefrom, the filter bag having a cylindrical sheath which extends from the upper end of the filter body downwardly to the lower side of the filter body and encompasses the exterior of the filter body, such filter bag also being formed with a pocket that extends concentrically downwardly from the upper end of the sheath into the filter body from the upper end of the filter body; and
    piping between the filter body discharge opening and the suction end of the water circulation system pump whereby upon operation of the pump swimming pool water is continually drawn from the filter container downwardly into the water inlet opening and the auxiliary water inlet openings and then out of the water discharge opening of the filter body into the piping to be returned to the swimming pool.

2. The combination as set forth in claim 1, which further includes a retainer removably securing the filter bag upon the filter body.

3. A combination as set forth in claim 1, where an O-ring is removably positioned around the upper outer portion of the filter bag to removably secure the filter bag upon the filter body.

4. The combination as set forth in claim 1, wherein the filter bag includes a handle for removing the filter bag upwardly off of the filter body.

5. The combination as set forth in claim 1, wherein the filter body water discharge orifice is smaller than the water inlet opening whereby upon operation of the water circulation system water flowing through the filter body form a vortex that traps debris within the pocket.

6. The combination as set forth in claim 1, wherein the swimming pool is of the above-ground type and the filter container is a skimmer box removably secured to the edge of the pool to receive swimming pool water that enters the water inlet opening of the filter body and the filter body discharge orifice is connected to the piping.

7. The combination as set forth in claim 1, wherein the swimming pool is of the above-ground type and the filter container is a casing attached to the swimming pool, the casing being formed with a swimming pool water-receiving window above the upper end of the filter body and the filter body discharge orifice is connected to the piping.

8. The combination set forth in claim 1, wherein the swimming pool is of the in-ground type having a skimmer bay, such skimmer bay is the filter container, the filter body is positioned in the skimmer bay with its upper end in communication with swimming pool water entering the skimmer bay and the filter body discharge opening is connected to the piping.

9. The combination set forth in claim 6, wherein an O-ring is removably positioned around the upper outer portion of the filter bag to removably secure the filter bag upon the filter body.

10. The combination set forth in claim 7, wherein an O-ring is removably positioned around the upper outer portion of the filter bag to removably secure the filter bag upon the filter body.

11. The combination set forth in claim 8, wherein an O-ring is removably positioned around the upper outer portion of the filter bag to removably secure the filter bag upon the filter body.

* * * * *